United States Patent
Amon et al.

(10) Patent No.: US 9,615,087 B2
(45) Date of Patent: Apr. 4, 2017

(54) METHOD FOR PROCESSING A COMPRESSED VIDEO STREAM

(75) Inventors: Peter Amon, München (DE); Andreas Hutter, München (DE); André Kaup, Effeltrich (DE); Marcus Laumer, Weisendorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 324 days.

(21) Appl. No.: 13/980,996

(22) PCT Filed: Jan. 16, 2012

(86) PCT No.: PCT/EP2012/050572
§ 371 (c)(1),
(2), (4) Date: Jul. 22, 2013

(87) PCT Pub. No.: WO2012/098078
PCT Pub. Date: Jul. 26, 2012

(65) Prior Publication Data
US 2013/0300940 A1    Nov. 14, 2013

(30) Foreign Application Priority Data
Jan. 21, 2011 (EP) ................................. 11151692

(51) Int. Cl.
*H04N 9/80* (2006.01)
*H04N 19/48* (2014.01)
(Continued)

(52) U.S. Cl.
CPC ....... *H04N 19/00563* (2013.01); *H04N 5/147* (2013.01); *H04N 19/146* (2014.11);
(Continued)

(58) Field of Classification Search
None
See application file for complete search history.

(56) References Cited

U.S. PATENT DOCUMENTS

2003/0095686 A1    5/2003 Montgomery
2007/0216781 A1*   9/2007 Miyanohara ............ 348/231.99
(Continued)

FOREIGN PATENT DOCUMENTS

CN       101325696 A      12/2008
EP          11151692       1/2011
WO  PCT/EP2012/050572     1/2012

OTHER PUBLICATIONS

Richard J. Radke et al., "Image Change Detection Algorithms: A Systematic Survey," IEEE Transactions on Image Processing, vol. 14, No. 3, Mar. 2005, pp. 294-307.
M. K. Mandal et al., "A critical evaluation of image and video indexing techniques in the compressed domain," Image and Vision Computing 17 (1999), pp. 513-529.
(Continued)

*Primary Examiner* — Hung Dang
(74) *Attorney, Agent, or Firm* — Slayden Grubert Beard PLLC

(57) ABSTRACT

For a compressed video stream formed of a sequence of compressed data packets, each compressed packet is assigned to a frame by processing the undecoded data packet. A frame includes packets. A first plurality of frames is assigned to a first sliding window and a second plurality of frames is assigned to a second sliding window. The first and second sliding windows have different frames. A first window indicator is calculated by determining a first indicator representing an average number of packets per frame within the first window, and/or a second indicator representing size information of the data within the first window. A second window indicator is calculated by determining a third indicator representing an average number of packets per frame within the second window, and/or a fourth indi-
(Continued)

cator representing size information of the data within the second window. The first and the second window indicators are compared.

22 Claims, 2 Drawing Sheets

(51) Int. Cl.
      *H04N 5/14*       (2006.01)
      *H04N 19/172*       (2014.01)
      *H04N 19/146*       (2014.01)
      *H04N 19/87*       (2014.01)
      *H04N 19/169*       (2014.01)

(52) U.S. Cl.
      CPC ......... *H04N 19/172* (2014.11); *H04N 19/188* (2014.11); *H04N 19/48* (2014.11); *H04N 19/87* (2014.11)

(56) References Cited

U.S. PATENT DOCUMENTS

2007/0217758 A1* 9/2007 Yahata et al. .................. 386/52
2009/0041114 A1* 2/2009 Clark ....................... 375/240.01
2014/0301486 A1* 10/2014 Liao ...................... H04N 19/87
                                                                            375/240.27

OTHER PUBLICATIONS

H. Schulzrinne et al., "RTP: A Transport Protocol for Real-Time Applications," RFC 3550, Internet Engineering Task Force, Jul. 2003, pp. 1-89.
J. Postel, "User Datagram Protocol," RFC 768, Internet Engineering Task Force, Aug. 28, 1980, pp. 1-3.
M. Schöberl et al., "Change detection in JPEG 2000 compressed video," Electronics Letters, vol. 46, No. 6, Mar. 18, 2010, 2 pages.
Feng Jie et al., "A Novel Scene Change Detection Algorithm for H. 264/AVC Bitstreams," 2008 IEEE Pacific-Asia Workshop on Computational Intelligence and Industrial Application, pp. 712-716.
Postel, "Transmission Control Protocol," RFC 793, Internet Engineering Task Force, Sep. 1981, prepared for Defense Advanced Research Projects Agency by Information Sciences Institute, 91 pages.
M. Laumer et al., "A Compressed Domain Change Detection Algorithm for RTP Streams in Video Surveillance Applications," in Proc. IEEE 13th Int. Workshop on Multimedia Signal Processing (MMSP), 2011, 6 pages.
Ishibashi et al., "Trends of Multimedia Applications from the Viewpoint of Quality of Service and Traffic Aspects," Japan Telecommunication Review, Telecommunications Association. Tokyo, JP, NTT Review, vol. 10, No. 2, Mar. 1, 1998, pp. 44-49.
English Language International Search Report for PCT/EP2012/050572, mailed Sep. 6, 2012, 3 pages.
Chinese Office Action mailed Oct. 28, 2015 in corresponding Chinese Patent Application No. 201280005958.9, 8 pages.

\* cited by examiner

METHOD FOR PROCESSING A COMPRESSED VIDEO STREAM

CROSS REFERENCE TO RELATED APPLICATIONS

This application is based on and hereby claims priority to International Application No. PCT/EP2012/050572 filed on Jan. 16, 2012 and European Application No. 11151692.8 filed on Jan. 21, 2011, the contents of which are hereby incorporated by reference.

BACKGROUND

The invention relates to a method for processing a compressed video stream formed of a sequence of compressed data packets, a computer program and a processing unit for processing a compressed video stream.

The basic idea of change detection is to detect any change of video content caused by, e.g. moving objects or illumination changes. Change detection may be the first step in a video processing chain and can be used to trigger subsequent analysis modules, like object detection, tracking or segmentation.

Usually, change detection is conducted in the so-called pixel domain. That means that the actual pixel data is required for any analysis of a scene of the video stream. As most review data is usually stored or transferred in a compressed representation, the received encoded bit stream has to be completely decoded beforehand in such a scenario. However, the decoding process often has a higher complexity than the analysis algorithm itself.

Therefore, attempts have been made to eliminate the cost-intensive step of decoding to be able to perform change detection analysis directly in the so-called compressed domain. Nevertheless, they still need prior decoding steps. Although they do not demand decoding up to the pixel domain, at least an entropy encoding has to be reverted to access the specific syntax elements of the particular codec. Entropy decoding is usually the most cost-intensive decoding step.

SUMMARY

One possible object is to provide a method and a processing unit for processing a compressed video stream which enables change detection in the compressed domain in a simpler and more cost-effective way.

The inventors propose a method for processing a compressed video stream formed of a sequence of compressed data packets. The method comprises the steps of a) receiving a compressed data packet; b) assigning the compressed data packet to a frame by processing the undecoded data packet, wherein a frame is formed of one or more data packets; c) assigning a first plurality of frames to a first sliding window and a second plurality of frames to a second sliding window wherein the first and the second sliding windows are formed of at least partially different frames; d) calculating a first window indicator by determining a first indicator representing an average number of data packets per frame within the first window, and/or a second indicator representing a size information of the data within the first window; e) calculating a second window indicator by determining a third indicator representing an average number of data packets per frame within the second window, and/or a forth indicator, representing a size information of the data within the second window; f) making a comparison based on the first and the second window indicators.

The method is based on the consideration that the amount of data will increase for frames with moving objects. Such an increase can be detected by the method suggested. As an advantage for change detection of a compressed video stream no decoding is required since all analyzed features can be directly extracted from the video stream. Furthermore, the method for detecting changes in a compressed video stream is independent from a codec. Furthermore, the method is extremely fast and therefore highly scalable. In particular up to 40.000 frames per second for a single video stream may be processed.

The first and the third indicator are used to detect sudden and significant content changes. Frames with sparse or no motion result in a small number of data packets per frame within the video stream. A sudden increase of data packets per frame indicates that this frame is not similar to the previous frames anymore. Typically, this is a result of a drastic change of the video content, for example a big moving object.

The second and the forth indicator are used to detect smaller changes in the video content, like small moving objects. If the amount of data of a single frame lies far below a maximum data packet size, a small change within the video content will not be recognized by the first and third indicator, since the number of packets will not increase. However, the packet size will and this increase is detected by the algorithm of the method suggested.

According to a preferred embodiment the size information of the data may be an average packet size per frame or an average frame size or a frame size (in particular in bytes).

The step of making the comparison comprises the steps of: f1) calculating a first factor from the first and the third indicator and/or a second factor from the second and forth indicator; f2) comparing the first factor to a first threshold and/or comparing the second factor to a second threshold, wherein an exceedance of the first and/or the second threshold is used as indicator for a content change in the video stream. Alternatively, the first and the second window indicators may be compared directly to each other.

According to a preferred embodiment processing the undecoded data packet comprises the step of extracting a timestamp from a header of the compressed data packet by a byte-reading operation. After receiving a data packet it is assigned to its corresponding frame by evaluating the timestamp of the data packet as described above. The timestamp represents the sample time of the data of the current data packet. For video streams the timestamp contains the time at which the current frame to which the video data included in a current data packet belongs to, should be displayed. As long as headers of the data packets are not encoded or compressed, the extraction of the timestamps includes simple byte-reading operations.

If the compressed video data is transmitted with the real-time transport protocol (RTP) from an encoder to a decoder over an IP-based network, the time value of the timestamp is not absolute, but relative to the values of previous data packets. In fact, an RTP timestamp of the first RTP data packet is a random integer of 32 bit length. For consecutive RTP packets, this value is increased by a certain amount according to the video frame rate, every time an RTP packet includes data of the next video frame in display order. Hence, an RTP packet receiver (decoder) can easily determine which RTP packet belongs to which video frame. The timestamp of each data packet is extracted from the video stream and each data packet is assigned to the corresponding video frame.

According to a further preferred embodiment determining the size of the compressed data packet is done by analyzing a transport layer packet in which the compressed data packet is encapsulated. In RTP, the packet size itself is not included in the RTP header of the data packet. However, the packet size can be determined by analyzing the transport layer packets in which the RTP packets are encapsulated. Usually, the used transport layer protocol is the user datagram protocol (UDP). The UDP header contains a field called "length". This field indicates the size of this UDP packet in bytes, including the UDP header and the payload. Hence, the RTP packet size is defined by the UDP packet size minus the size of the fixed-length UDP header and can therefore be easily determined.

According to a further preferred embodiment the first and the second sliding windows have a fixed size, measured in frames. The number of frames is at least two. In particular, the size is chosen between five and twenty, preferably around ten frames.

The first and the second sliding windows move a given number of frames forward each time a given number of frames have been received. As a single frame may be represented by several data packets, the number of data packets within a sliding window may vary.

According to a further preferred embodiment the first and/or the second threshold are calculated by a training and/or threshold phase by iterative carrying out steps a) to f) during which the video stream contains no or primarily no content change while storing a plurality of determined first and second factors to process them to calculate the first and/or the second thresholds as a measure for the first and the second factor during a still or nearly still scene. It is to be understood that the training and threshold phase will be carried out after the first window and the second window have been filled with data. It is preferred that the first window is filled first and the second window is filled afterwards. After this kind of initialization phase of the algorithm is completed, the first and the second window contain the packet sizes of a certain number of video frames that represent the beginning of the sequence.

The training phase may start right after the first and the second windows have been filled with data. The training phase is used to train the algorithm for a current video content. To be able to guarantee that the algorithm can detect uncommon events during an analysis phase as described above, the video content during training phase should not contain uncommon events. Therefore, the training phase is made with video data containing a still or nearly still scene. This means, that for many scenarios no moving object should be present in the scene.

During the training phase the sliding windows are moving forward and newly received data packets are processed as described above. The training calculates two factors at each training step, or more precisely, each time the windows move one frame forward and adding these factors to their respective history. This factor history is used for calculating their thresholds in the threshold phase.

After having completed the training with enough first and/or second factors, the first and/or second thresholds are calculated. They are used in the analysis phase for detecting content changes. The value of the thresholds indicates how accurate content changes should be detected. As the statistical distribution of data packet sizes can be quite different for several video contents, the thresholds should not be static for all video sequence, but dynamically calculated for each sequence.

The first and/or the second thresholds are calculated by $$th^{ANORP} = c_{th}^{ANORP} \cdot PAR^{ANORP} \text{ and/or}$$

$$th^{ARPS} = c_{th}^{ARPS} \cdot PAR^{ARPS} \text{ with}$$

$$PAR^{ANORP} = \frac{\max_{1 \leq i \leq n} H^{ANORP}(i)}{\frac{1}{n}\sum_{i=1}^{n} H^{ANORP}(i)} \text{ and/or}$$

$$PAR^{ARPS} = \frac{\max_{1 \leq i \leq n} H^{ARPS}(i)}{\frac{1}{n}\sum_{i=1}^{n} H^{ARPS}(i)}$$

wherein n indicates the number of the first/second factors, stored in history $H^{ANORP}/H^{ARPS}$ and $c_{th}^{ANORP}/c_{th}^{ARPS}$ is a given constant value. With the value of $c_{th}^{ANORP}/c_{th}^{ARPS}$ it can be defined whether small or big changes in the content of the video stream shall be detected. The properties of an analyzed scene usually do not change during the analysis. Hence, the thresholds are calculated only once during the threshold phase at the beginning of the analysis.

According to a further preferred embodiment the compressed video data is transmitted with the real-time transport protocol (RTP) from an encoder to a decoder, in particular over an IP-based network.

According to a further preferred embodiment, the compressed video stream is video content with sparse motion, especially surveillance applications.

Common hybrid video encoders usually spend more data rate for Intra frames (i.e. intra coded frames) than for P frames (i.e. inter-predicted frames). Therefore, it is most likely that even in video sequences with sparse motion, information of an Intra frame is much larger and results in plural data packets compared to other frames. In such a case, both defined indicators will detect a content change although the actual content is equal to the content of the previous frames. Hence, the algorithm needs to know which frames are Intra frames in order to avoid false detections.

According to a further preferred embodiment Intra frames (I frames) are not considered for determining the first and/or the second factors. Since the average number of data packets per frame and/or the average packet size per frame is used as an indicator for detecting a content change Intra frames are ignored in the present algorithm as a general rule.

For detection of Intra frames, it is therefore suggested to rely on the fact that in lots of common video surveillance systems the distance between two Intra frames is fixed. This means that at the beginning of the analysis the algorithm has to be initialized with the current Intra frame distance manually. Then, the first and/or second factors will not be calculated for these Intra frames and the factors and indicators are not distorted by their data packet sizes.

Alternatively, for detection of Intra frames a byte-reading operation, in particular of the first byte, of the payload header of the compressed data packet is carried out for the decision whether the data packet contains data of an Intra frame or an inter-predicted frame. Since the payload header is not entropy encoded (e.g. not variable length coded) this information can be easily retrieved from the data packet.

In a further alternative, for detection of Intra frames it is determined whether at least one of the first and/or the second factors exceed its corresponding threshold due to a single frame. In case that the first and/or second threshold is exceeded due to a single frame, an Intra frame is assumed. Alternatively, the size of the frames may be evaluated. In case a frame is significantly larger than its successor or predecessor, it probably is an Intra frame.

The inventors further propose a computer program product directly loadable into the internal memory of a digital computer, comprising software code portions for performing the method when said product is run on a computer.

The inventors further propose a processing unit for processing a compressed video stream formed of a sequence of compressed data packet, comprising:
 a) first unit for receiving a compressed data packet;
 b) second unit for assigning the compressed data packet to a frame by processing the undecoded data packet, wherein a frame includes one or more data packets;
 c) third unit for assigning a first plurality of frames to a first sliding window and a second plurality of frames to a second sliding window wherein the first and the second sliding windows are formed of at least partially different frames;
 d) forth unit for calculating a first window indicator by determining
  a first indicator representing an average number of data packets per frame within the first window, and/or
  a second indicator representing a size information of the data within the first window;
 e) fifth unit for calculating a second window indicator by determining
  a third indicator representing an average number of data packets per frame within the second window, and/or
  a forth indicator representing a size information of the data within the second window;
 f) sixth unit for making a comparison based on the first and second window indicators.

The processing unit has the same advantages as described above. The processing unit may comprise further elements for carrying out preferred embodiments of the method described.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
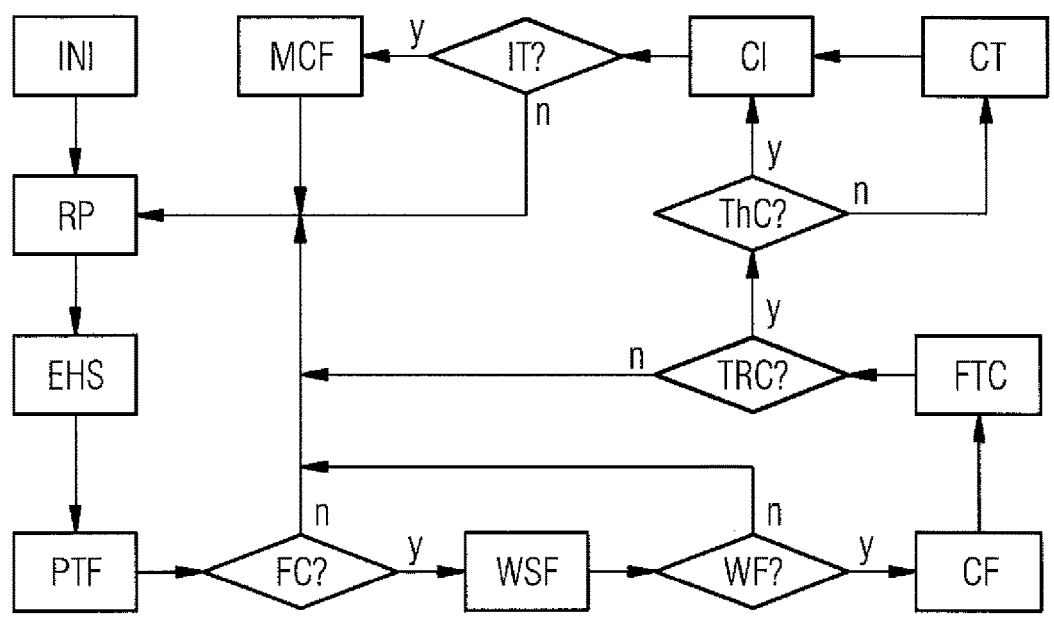
FIG. 1 shows a diagram illustrating a change detection algorithm according to the proposed method.

Reference will now be made in detail to the preferred embodiments of the present invention, examples of which are illustrated in the accompanying drawings, wherein like reference numerals refer to like elements throughout.

In the following description it is assumed that a compressed video stream is transmitted with the Real-time Transport Protocol (RTP) for transmission over an IP-based network. In RTP data in the payload is compressed. The information in the header is not compressed. Therefore, it is possible to determine header features directly from the received compressed bit stream with simple byte-reading operations. Using these properties, change detection of a compressed video system can be conducted in the compressed domain without any prior decoding of the bit stream.

However, it is to be understood, that RTP is only used by way of example. The transmission of the data packets of the video streams could be in any protocol which divides video data in packets wherein a single packet is assignable to a frame number and in which header information can be extracted easily.

It is further to be noted, that the method described below has not to be conducted from a decoder. The algorithm may be carried out by any analyzing unit which may receive the compressed video stream in parallel to the decoder. However, the analyzing unit may also be part of the decoder.

The presented algorithm is codec-independent, due to the fact that it only operates on the RTP layer. Regardless of which codec is used to encode the actual video data, the RTP packets, in which the video data is packetized for transmission over a network, have the same structure in any case.

Usually, video content in video surveillance systems has predominantly sparse motion. This means a scene is formed of the same background for a long period of time. As a result, for a corresponding RTP stream the RTP packets are comparatively small due to the fact that common video encoders are able to exploit similarities between consecutive frames. Therefore, they reduce the amount of redundant information by reusing already transmitted data. This behaviour will change if, for example, a moving object occurs within the video content. The consequence is that the amount of data will increase for frames with moving objects. This increase is detected by the developed algorithm.

FIG. 1 shows a block diagram illustrating a change detection algorithm for analyzing a compressed video stream. The developed algorithm can be divided in four phases. The first phase is an initialization phase, succeeded by a training phase and a threshold phase. After that an analysis phase will be conducted.

The first step of the initialization phase is an initializing (INI) of a data structure for storing data to be evaluated. The data structure comprises two sliding windows Win1, Win2 and histories for so called ANORP and ARPS factors which will be explained later.

After receiving an RTP packet (RP) it has to be assigned to its corresponding frame. This is done by evaluating the RTP header, in particular the timestamp field and a packet size (EHS).

The RTP timestamp represents the sample time of the data of the current RTP packet. For video, that means the time at which the current frame to which the video data included in the current RTP packet belongs to should be displayed. Thereby, the time value is not absolute, but relative to the values of previous packets. In fact, the RTP timestamp of the first RTP packet is a random integer of 32 bit length. For consecutive RTP packets, this value is (according to the video frame rate) increased by a certain amount every time an RTP packet includes data of the next video frame in display order. Hence, an RTP packet receiver can easily determine which RTP packet belongs to which video frame. Within the algorithm presented, the RTP timestamp of each packet is extracted from the video stream. Each RTP packet is then assigned to the corresponding video frame. As RTP headers are not encoded or compressed, the extraction of the timestamps includes simple byte-reading operations.

The packet size itself is not included in the RTP header but can be determined by analyzing a transport layer packet in which the RTP packet was encapsulated. Usually, the used transport layer protocol is the user datagram protocol (UDP) which contains a field called "length". This field indicates the size of this UDP packet in bytes, including the UDP header and the payload. Hence, the RTP packet size is defined by the UDP packet size minus the size of the fixed-length UDP header and can therefore be easily determined.

The RTP packet size of a packet assigned to a frame is stored in a sliding window. As long as the frame is not completed (FC, path n) a further packet is received (RP) and processed as described. A sliding window has a fixed size, measured in frames and moves one forward each time a complete frame has been received (FC, path y) from the network (WSF). As a single frame may be represented by several RTP packets, the number of RTP packets within a sliding window may vary. A sliding window comprises of at least two frames. It has been found that the number of frames of a sliding window is between five and 20. Preferably, around ten frames are used within a sliding window.

In the algorithm two separate sliding windows are used. The initialization phase comprises filling these two windows with data by repeating aforementioned blocks RP, EHS, PTS, FC, WSF and WF. Thereby, the first window (Win1) is filled first and the second window (Win2) is filled afterwards. After this first initialisation phase of the algorithm is completed, those windows contain the packet sizes of a certain number of video frames that represent the beginning of the sequence.

Figure 2:
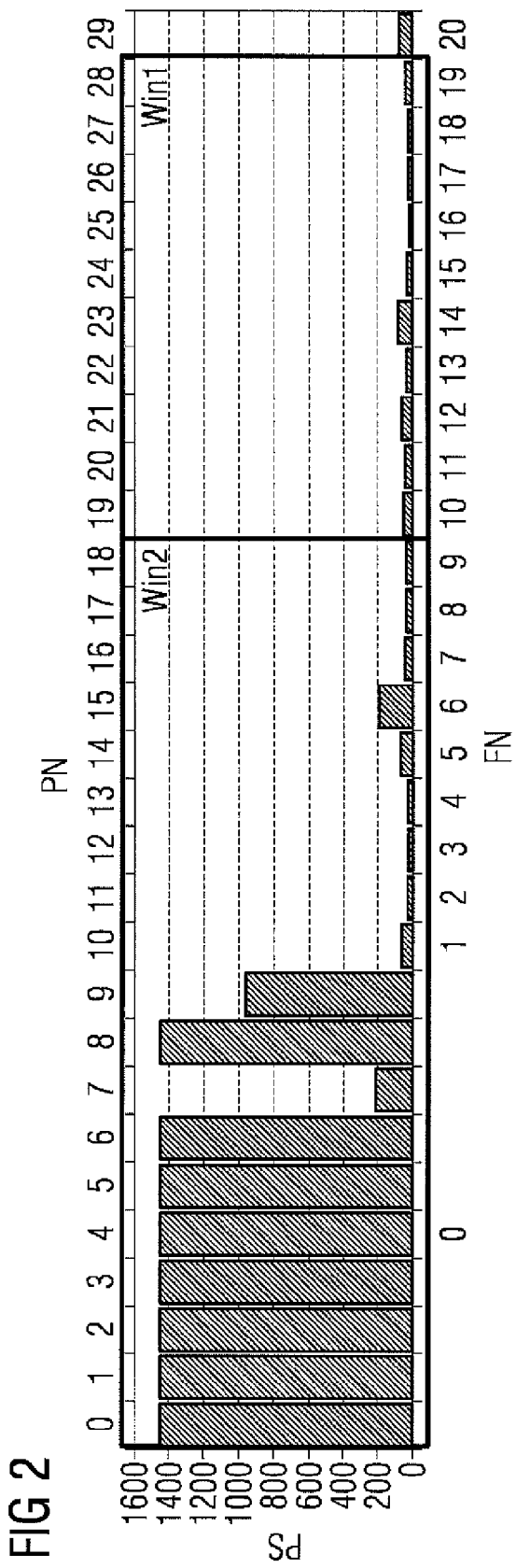
FIG. 2 shows a diagram illustrating data packets of an Intra frame in comparison to other frames.

The sliding windows Win1, Win2 are illustrated in FIG. 2. In this example, the windows Win1, Win2 have a size of ten frames and the diagram is a snapshot at the end of the initialisation phase.

In FIG. 2 x-axis depicts a packet number PN and a frame number FN. PS represents the packet size of each data packet. As can be seen frame number FN "0" is formed by ten data packets "0", . . . , "9" whereas the other frames "1", . . . , "19" are formed by one packet. Frame number FN "0" is an Intra frame (I frame) with comparable big packet sizes PS, all other frames are inter-predicted frames (P frames) with smaller packet sizes PS.

The second phase, the training phase, starts right after the first and second windows have been filled with data packets. This phase is required to train the algorithm for a current video content. To be able to guarantee that the algorithm can detect uncommon events during the analysis phase, the video content during the training phase should not contain such events. For many scenarios this means that no moving objects should be present in the scene.

During the training phase, the sliding windows Win1, Win2 are still moving forward and newly received RTP packets are processed as described above. The training includes calculating two factors at each single step, or more precisely each time the windows Win1, Win2 move one frame forward, and adding these factors to their respective history (FTC). The factors calculated in block CF are called ANORP factor and ARPS factor, and according to them, the algorithm can decide if a content changed occurred.

ANORP stands for the average number of RTP packet per frame within one sliding window, whereas ARPS indicates the average RTP packet size per frame within the same window.

The ANORP factor evaluates the number of RIP packets per frame and is useful to detect sudden and significant content changes. Frames with sparse or no motion result in small numbers of RTP packets per frame within the stream. A sudden increase of RTP packets per frame indicates that this frame is not similar to the previous frames anymore and that usually means a drastic change of the video content, for example a big moving object.

The number of RTP packets per frame also depends on the maximum RTP packet size that may not be exceeded. This maximum is usually set to 1450 bytes, due to the historical reason to not exceed the maximum length of an Ethernet frame. If the amount of data of a single frame exceeds this maximum, the data is fragmented into several RTP packets and the RTP packets are marked accordingly. The effectiveness of the developed algorithm is not affected by the maximum packet size, since the second indicator is not aware of this limit.

The ARPS factor is determined by the average RTP packet size per frame and is used to detect smaller changes, like small moving objects. If the amount of data of a single frame lies far below the maximum RTP packet size, a small change within the video content will not be recognized by the first indicator, since the number of packets will not increase. However, the RTP packet size will and this increase is also detected by the algorithm.

ANORP and ARPS factors are calculated for both sliding windows Win1, Wing and are denoted as $ANORP_{Win1}$, $ANORP_{Win2}$ and $ARPS_{Win1}$, $ARPS_{Win2}$, respectively. After that, they are compared to each other by calculating their ratio ($f^{ANORP}$, $f^{ARPS}$). The resulting values are the mentioned factors. Hence, the ANORP factor $f^{ANORP}$ is defined as $$f^{ANORP} = \frac{ANORP_{Win1}}{ANORP_{Win2}}. \qquad (1)$$

The ARPS factor $f^{ARPS}$ is defined accordingly:

$$f^{ARPS} = \frac{ARPS_{Win1}}{ARPS_{Win2}}. \qquad (2)$$

Both factors $f^{ANORP}$, $f^{ARPS}$ are stored in a factor history (FTC) for calculating their thresholds in the next phase.

The training phase is succeeded until a sufficient number of the factors $f^{ANORP}$, $f^{ARPS}$ has been added to the history. Whether the training is complete is checked in block TRC. If the training is not completed (TRC, path n) the blocks RP, EHS, PTF, FC, WSF, WF, CF and FTC are repeated. If the training is complete (TRC, path y) the threshold phase starts.

When the training is completed and enough previous ANORP and ARPS factors $f^{ANORP}$, $f^{ARPS}$ have been stored in the history, the thresholds that are used in the analysis phase for detecting content changes are calculated. In block ThC it is checked, whether thresholds are already calculated. If not (ThC, path n) the thresholds for ANORP and ARPS factors are calculated (block CT). If the thresholds are already known (ThC, path y) ANORP and ARPS indicators $i^{ANORP}$, $i^{ARPS}$ are calculated (block CI).

The value of the thresholds indicates how accurate content changes should be detected. As the statistical distribution of RTP packet sizes can be quite different for several video contents, the thresholds $th^{ANORP}$, $th^{ARPS}$ should not be static for all video sequence, but dynamically calculated for each sequence.

The ANORP factor threshold $th^{ANORP}$ is determined by calculating the peak to average ratio (PAR) of the factors of the history. Thereto, the maximum ANORP factor is divided by the average ANORP factors contained in the history. Hence, the ANORP factor threshold $th^{ANORP}$ is defined as follows:

$$th^{ANORP} = c_{th}^{ANORP} \cdot PAR^{ANORP} \qquad (3).$$

where $$PAR^{ANORP} = \frac{\max_{1\leq i \leq n} H^{ANORP}(i)}{\frac{1}{n}\sum_{i=1}^{n} H^{ANORP}(i)}. \quad (4)$$

and n indicates the number of ANORP factors, stored in history $H^{ANORP}$, and $c_{th}^{ANORP}$ as previously defined constant value.

The ARPS factor threshold $th^{ARPS}$ definition is similar to the ANORP factor threshold definition. It is determined by the peak to average ratio (PAR) of the factors within the history. Therefore, the ARPS factor threshold $th^{ARPS}$ is defined as follows:

$$th^{ARPS} = c_{th}^{ARPS} \cdot PAR^{ARPS} \quad (5).$$

where $$PAR^{ARPS} = \frac{\max_{1\leq i \leq n} H^{ARPS}(i)}{\frac{1}{n}\sum_{i=1}^{n} H^{ARPS}(i)}. \quad (6)$$

As for ANORP, n indicates the number or ARPS factors stored in history $H^{ARPS}$, and $c_{th}^{ARPS}$ is a previously defined constant value.

The properties of the analyzed scene usually do not change during the analysis. Hence, the thresholds $th^{ANORP}$, $th^{ARPS}$ are calculated only once during the threshold phase at beginning of the analysis. Alternatively, e.g., if the properties of the video scene changes, the thresholds $th^{ANORP}$, $th^{ARPS}$ can be determined once again.

If the training and the threshold calculation is finished, the analysis phase, i.e. the processing of the compressed video stream for detecting a content change in the video stream can be started. In this phase, all previously mentioned steps (RP, EHS, PTF, FC, WSF, WF, CF, FTC, TRC, ThC, CI), except the threshold calculation, are still done accordingly. Additionally, two indicators $i^{ANORP}$, $i^{ARPS}$ are determined that indicate a positive change detection.

The first indicator iANORP evaluates the current ANORP factor by comparing its value to the previously calculated ANORP factor threshold thANORP. A change is detected, if the current value exceeds the threshold. The second indicator iARPS has similar behaviour as it compares to current ARPS factor TARPS with the ARPS factor threshold thARPS. If one of the two indicators becomes true the current frame is marked as containing a content change.

Referring to FIG. 1 in block IT it is checked whether one of the two indicators becomes true. (IT, path y) if one of the two indicators is true, (IT, path n) if none of the indicators is true. In block MCF a frame is marked in case one of the indicators is true.

The indicators are defined as follows:

$$i^{ANORP} = \begin{cases} \text{true} & f^{ANORP} > th^{ANORP} \\ \text{false} & \text{otherwise} \end{cases} \quad (7)$$

$$i^{ARPS} = \begin{cases} \text{true} & f^{ARPS} > th^{ARPS} \\ \text{false} & \text{otherwise} \end{cases}.$$

A content change is detected in case at least one of the indicators, i.e. $i^{ANORP}$ or $i^{ARPS}$, becomes true.

Common hybrid video encoders usually spend much more data rate for so-called I frames, i.e. intra coded frames, than for so-called P frames, i.e. inter-predicted frames. Therefore, it is most likely that even in a video sequence with sparse motion, the corresponding RTP packets of an I frame are much larger and numerous than the packets of other frames. This is depicted in FIG. 2. In FIG. 2 frame number FN "0" represents an I frame and all other frames shown in the figure are P frames.

In such a case, those defined indicators will detect a content change, although the actual content is equal to the content of the previous frames. Hence, the algorithm needs to know which frames are I frames, in order to avoid false detections. Unfortunately, RTP does not provide any mechanism for easily detecting I frames within an RTP stream. The solution described therefore relies on the fact that in most common video surveillance systems the distance between two I frames is fixed. As a result, at the beginning of the analysis, the algorithm has to be initialized with the current I frame distance manually. Then, the ANORP and ARPS values will not be calculated for these I frames and the factors and indicators are not distorted by their RTP packet sizes.

In case the I frame rate is not constant, other indicators to detect I frames have to be used. For codec H.264/AVC, an option is to check the RTP payload header which is represented by the first byte of the RTP payload. In case the RTP packets contain only single NAL units, the RTP payload header is equivalent to the NAL unit header as defined in H.264/AVC. The NAL unit header contains a field nal_unit_type. A value of five for the field nal_unit_type indicates an IDR slice. If all NAL units, i.e. RTP packets, of a frame are IDR slices, the frame is an IDR frame and has similar properties as I frames. Since the payload header is not entropy coded (e.g. not variable length coded) it can be easily retrieved from the RTP packet.

If a NAL unit is fragmented into several RTP packets, the first byte of the payload of each RTP packet is the so-called FU indicator which indicates that the RTP payload is one fragment of a NAL unit. In this case, the next byte after the FU indicator, the FU header contains the nal_unit_type of the fragmented NAL unit. As before, the FU indicator and the FU header are not entropy coded and the value of nal_unit_type can therefore also be easily retrieved from the RTP packets. Furthermore, during the initialization phase it could be checked, whether a content change has been detected (by analysing ARPS and/or ANORP factors $f^{ARPS}$, $f^{ANORP}$) due to a single frame. If this is the case, this is an indicator for an I frame. If more than one frame causes changing ARPS and/or ANORP factors, this is an indicator for a content change.

Similar to the detection of I frames (but more general), also regular coding patterns in the temporal direction can be learned during the training phase. A good example is a quantisation parameter (QP) cascading, e.g. used for a temporal scalability, In QP cascading, different quantisation step sizes are used for consecutive frames, depending on the temporal level of the frame. The lower the temporal level, the lower is the quantisation parameter and the higher is the size of the frame since finer quantisation is used. This way, the regular pattern of QP cascading can be learned during the training phase of the algorithm. In this case, a change can be detected when the received stream does not follow the pattern learned during the training phase.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV,* 69 USPQ2d 1865 (Fed. Cir. 2004).

The invention claimed is:

1. A method for processing a compressed video stream formed of a sequence of compressed data packets, the method comprising:
   during a training phase, analyzing a first video stream portion by:
   (a) receiving a series of compressed data packets of the first video stream portion;
   (b) for each received compressed data packet, assigning the compressed data packet to a frame based on data of the compressed data packet, wherein a frame includes one or more compressed data packets;
   (c) assigning a first plurality of frames to a first sliding window and a second plurality of frames to a second sliding window,
   (d) periodically calculating a first window indicator by determining
      a first indicator representing an average number of compressed data packets per frame within the first sliding window, and/or
      a second indicator representing size information of data within the first sliding window;
   (e) periodically calculating a second window indicator by determining
      a third indicator representing an average number of compressed data packets per frame within the second sliding window, and/or
      a fourth indicator representing size information of data within the second sliding window; and
   (f) periodically calculating a training phase change factor indicating a variation between the first window indicator and the second window indicator; and
   (g) automatically determining a change threshold factor based on the periodically calculated training phase change factor;
   during an analysis phase, analyzing a second video stream portion based on the change threshold factor by:
   receiving a series of compressed data packets of the second video stream portion,
   analyzing the compressed data packets of the second video stream portion according to steps (b) through (f) to periodically calculate an analysis phase change factor for the compressed data packets of the second video stream portion,
   compare the periodically calculated analysis phase change factor to the change threshold factor; and
   identifying a video content change in response to the analysis phase change factor exceeding the change threshold factor.

2. The method according to claim 1, comprising undecoding data from each compressed data packet prior to assigning the compressed data packet to a frame, wherein undecoding data from the compressed data packet is performed without an entropy encoding process.

3. The method according to claim 1, wherein the first window indicator is calculated by determining the first indicator, and the second window indicator is calculated by determining the third indicator.

4. The method according to claim 1, wherein the first window indicator is calculated by determining the second indicator, and the second window indicator is calculated by determining the fourth indicator.

5. The method according to claim 1, wherein the size information is an average packet size per frame or an average frame size.

6. The method according to claim 1, comprising undecoding data from each compressed data packet prior to assigning the compressed data packet to a frame, wherein undecoding data from the compressed data packet comprises extracting a timestamp from a header of the compressed data packet by a byte-reading operation.

7. The method according to claim 1, wherein determining the size information of data comprises determining a size of the compressed data packet by analyzing a transport layer packet in which the compressed data packet is encapsulated.

8. The method according to claim 1, wherein the first and second sliding windows have a fixed size, measured in frames.

9. The method according to claim 1, wherein the first and second sliding windows relate to a fixed length time interval, and the first and second sliding windows contain the frames received during the respective time interval such that different sliding windows contain a different number of frames.

10. The method according to claim 1, wherein the change threshold factor is calculated by $$th^{ANORP} = c_{th}^{ANORP} \cdot PAR^{ANORP}$$

and/or $$th^{ARPS} = c_{th}^{ARPS} \cdot PAR^{ARPS}.$$

with $$PAR^{ANORP} = \frac{\max_{1 \leq i \leq n} H^{ANORP}(i)}{\frac{1}{n} \sum_{i=1}^{n} H^{ANORP}(i)} \text{ and/or}$$

$$PAR^{ARPS} = \frac{\max_{1 \leq i \leq a} H^{ARPS}(i)}{\frac{1}{n} \sum_{i=1}^{n} H^{ARPS}(i)}$$

wherein
ANORP indicates an average number of data packets per frame,
ARSP indicates an average packet size per frame,
$th^{ANORP}$ and $th^{ARPS}$ indicate the first and second thresholds, respectively,
n indicates number of the first/second factors stored in a history $H^{ANORP}/H^{ARPS}$, and
$c_{th}^{ANORP}/c_{th}^{ARPS}$ is a given constant value.

11. The method according to claim 1, wherein the compressed video stream is transmitted with a Real-time Transport Protocol (RTP).

12. The method according to claim 1, wherein the compressed video stream contains video content with sparse motion.

13. The method according to claim 12, wherein the compressed video stream is a video surveillance video stream.

14. The method according to claim 1, wherein Intra frames are not considered for determining the first and second window indicators.

15. The method according to claim 14, wherein Intra frames are predicted or estimated based on knowledge that Intra frame coding uses a fixed distance between two consecutive Intra frames.

16. The method according to claim 14, wherein Intra frames are detected in a byte-reading operation of a payload header of the compressed data packets, to decide whether each compressed data packet contains data of an Intra frame or data of an interpredicted frame.

17. The method according to claim 16, wherein the bytereading operation reads a first byte of the payload header.

18. The method according to claim 14, wherein Intra frames are detected by determining whether at least one of the first factor and/or the second factor exceed a corresponding threshold, and detecting an Intra frame if the corresponding threshold is exceeded due to a single frame.

19. A non-transitory computer readable storage medium storing a program, which when executed by a digital computer, causes the digital computer to perform a method for processing a compressed video stream formed of a sequence of compressed data packets, the method comprising:
  during a training phase, analyzing a first video stream portion by:
    (a) receiving a series of compressed data packets of the first video stream portion;
    (b) for each received compressed data packet:
    (b) for each received compressed data packet, assigning the compressed data packet to a frame based on data of the compressed data packet, wherein a frame includes one or more compressed data packets;
    (c) assigning a first plurality of frames to a first sliding window and a second plurality of frames to a second sliding window,
    (d) periodically calculating a first window indicator by determining
      a first indicator representing an average number of compressed data packets per frame within the first sliding window, and/or
      a second indicator representing size information of data within the first sliding window;
    (e) periodically calculating a second window indicator by determining
      a third indicator representing an average number of compressed data packets per frame within the second sliding window, and/or
      a fourth indicator representing size information of data within the second sliding window; and
    (f) periodically calculating a training phase change factor indicating a variation between the first window indicator and the second window indicator; and
    (g) automatically determining a change threshold factor based on the periodically calculated training phase change factor;
  during an analysis phase, analyzing a second video stream portion based on the change threshold factor by:
    receiving a series of compressed data packets of the second video stream portion,
    analyzing the compressed data packets of the second video stream portion according to steps (b) through (f) to periodically calculate an analysis phase change factor for the compressed data packets of the second video stream portion,
    compare the periodically calculated analysis phase change factor to the change threshold factor; and
    identifying a video content change in response to the analysis phase change factor exceeding the change threshold factor.

20. A processing unit to process a compressed video stream formed of a sequence of compressed data packets, comprising:
  a receiver unit to receive compressed data packets;
  a first assignment unit to assign each compressed data packet to a frame based on data of the compressed data packet, wherein a frame includes one or more compressed data packets;
  a second assignment unit to assign a first plurality of frames to a first sliding window and a second plurality of frames to a second sliding window wherein the first and second sliding windows are formed from at least partially different frames;
  a first calculation unit to calculate a first window indicator by determining
    a first indicator representing an average number of compressed data packets per frame within the first sliding window, and/or
    a second indicator representing size information of data within the first sliding window;
  a second calculation unit to calculate a second window indicator by determining
    a third indicator representing an average number of compressed data packets per frame within the second sliding window, and/or
    a fourth indicator representing size information of data within the second sliding window; and
  a comparison unit to make comparisons based on the first and second window indicators;
  wherein the receiver unit, first and second assignment units, first and second calculation units, and comparison unit are configured to cooperate to:
    during a training phase in which compressed data packets of a first video stream portion are received at the receiver unit:
      calculate values of the first and second indicators for respective frames in the first and second sliding windows, based on the received compressed data packets of the first video stream portion,
      calculate a training phase change factor indicating a variation between the values of the first and second window indicators, and
      automatically determine a change threshold factor based on the training phase change factor,
    during an analysis phase in which compressed data packets of a second video stream portion are received at the receiver unit:
      calculate values of the first and second indicators for respective frames in the first and second sliding windows, based on the received compressed data packets of the second video stream portion,
      calculate an analysis phase change factor indicating a variation between the values of the first and second window indicators,
      compare the analysis phase change factor to the change threshold factor; and
      identify a video content change in response to the analysis phase change factor exceeding the change threshold factor.

21. A method for processing a compressed video stream formed of a sequence of compressed data packets, the method comprising:
  receiving a series of compressed data packets;
  for each received compressed data packet, assigning the compressed data packet to a frame based on data of the compressed data packet, wherein a frame includes one or more compressed data packets;
  assigning a first plurality of frames to a first sliding window and a second plurality of frames to a second sliding window, wherein the first and second sliding windows are at least partially distinct from each other;

periodically calculating a first window indicator representing an average number of compressed data packets per frame within the first sliding window;

periodically calculating a second window indicator representing an average number of compressed data packets per frame within the second sliding window;

periodically calculating a phase change factor indicating a variation between the first window indicator and the second window indicator;

comparing the periodically calculated phase change factor to a change threshold factor; and identifying a video content change in response to the phase change factor exceeding the change threshold factor.

22. The method according to claim 21, wherein the change threshold factor is determined by analyzing a training video stream portion during a training phase performed prior to receiving the series of compressed data packets.

* * * * *